United States Patent
Kozel et al.

(10) Patent No.: US 10,878,370 B1
(45) Date of Patent: Dec. 29, 2020

(54) CONDITIONAL FORMATING FOR DISPLAY LARGE SCALE INFORMATION ANALYTICS OF RELIABILITY DATA

(71) Applicant: EMC IP Holding Company LLC, Hopkinton, MA (US)

(72) Inventors: Michael J. Kozel, Upton, MA (US); David Dumas, Sturbridge, MA (US); Tomer Jackman, Southborough, MA (US); Michael Hanam, Shrewsbury, MA (US); Robert Szymanski, Hopedale, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1001 days.

(21) Appl. No.: 14/319,854

(22) Filed: Jun. 30, 2014

(51) Int. Cl.
*G06Q 10/08* (2012.01)
*G06Q 10/06* (2012.01)

(52) U.S. Cl.
CPC ..... *G06Q 10/0838* (2013.01); *G06Q 10/0639* (2013.01); *G06Q 10/06393* (2013.01); *G06Q 10/06395* (2013.01)

(58) Field of Classification Search
CPC ........... G06Q 10/0838; G06Q 10/0639; G06Q 10/06393; G06Q 10/06395
USPC ...................................................... 705/7.38
See application file for complete search history.

(56) References Cited

U.S. PATENT DOCUMENTS

| | | | | |
|---|---|---|---|---|
| 5,999,918 A * | 12/1999 | Williams | ............... | G06Q 40/00 702/179 |
| 6,058,368 A * | 5/2000 | Aourane | .......... | G06Q 10/06375 705/7.37 |
| 6,675,129 B1 * | 1/2004 | Cambon | ................ | G06Q 30/02 700/109 |
| 2002/0069096 A1 * | 6/2002 | Lindoerfer | ............. | G06Q 10/08 705/7.25 |
| 2002/0113792 A1 * | 8/2002 | Pena-Nieves | .......... | G06Q 30/02 345/440 |

(Continued)

OTHER PUBLICATIONS

Forecasting field failure data for repairable systems using neural networks and SARIMA model. Lee-Ing et al. The International Journal of Quality & Reliability Management 22.4/5: 410-420. Emerald Group Publishing Limited. (2005).*

(Continued)

*Primary Examiner* — Timothy Padot
(74) *Attorney, Agent, or Firm* — Van Pelt, Yi & James LLP

(57) ABSTRACT

Techniques to display and analyze reliability data about a large population of objects are disclosed. In some embodiments, reliability data is arranged in an array, comprising a plurality of linear arrays each of which includes reliability data for a corresponding reporting period. The reliability data includes for each of a plurality of subpopulations a corresponding reliability metric for that subpopulation with respect to the reporting period. A statistics-based conditional formatting is applied to at least a subset of cells comprising the array. The statistics-based conditional formatting may be applied by invoking a function or other automated method to apply a first cell formatting to a first set of cells having a first degree of statistical significance relative to a reference population of cells and a second cell formatting to a second set of cells having a second degree of statistical significance relative to the reference population.

35 Claims, 11 Drawing Sheets

(56) References Cited

U.S. PATENT DOCUMENTS

| | | | | |
|---|---|---|---|---|
| 2005/0044066 A1* | 2/2005 | Hooper | ............... | G06F 16/58 |
| 2005/0102112 A1* | 5/2005 | Reichler | ............... | G01F 1/007 |
| | | | | 702/45 |
| 2006/0020509 A1* | 1/2006 | Strain | ............... | G06Q 30/0224 |
| | | | | 705/14.25 |
| 2006/0277087 A1* | 12/2006 | Error | ............... | G06Q 10/10 |
| | | | | 705/7.18 |
| 2007/0274304 A1* | 11/2007 | Lycette | ............... | G06Q 10/04 |
| | | | | 370/370 |
| 2009/0222622 A1* | 9/2009 | Petrescu | ............... | H04N 21/23116 |
| | | | | 711/114 |
| 2010/0274596 A1* | 10/2010 | Grace | ............... | G06Q 40/02 |
| | | | | 705/7.15 |
| 2011/0066605 A1* | 3/2011 | Elbaz | ............... | G06F 16/252 |
| | | | | 707/705 |
| 2011/0178833 A1* | 7/2011 | Chowdhary | ............... | G06Q 10/067 |
| | | | | 705/7.12 |
| 2014/0089029 A1* | 3/2014 | Belur | ............... | G06Q 10/1097 |
| | | | | 705/7.21 |
| 2014/0281713 A1* | 9/2014 | Hampapur | ............... | G06F 11/0787 |
| | | | | 714/26 |

OTHER PUBLICATIONS

Fujitsu Develops Industry's First System-Failure Management Technology for Cloud Computing Era. Anonymous. ACN Newswire—Asia Corporate News [Tokyo] Feb. 23, 2010.*

* cited by examiner

| Returns | | | | | | | | | | | | | |
|---|---|---|---|---|---|---|---|---|---|---|---|---|---|
| Apr-14 | 469 | 539 | 837 | 1019 | 864 | 889 | 767 | 694 | 472 | 196 | 121 | 58 | |
| Mar-14 | 8 | 8 | 18 | 14 | 11 | 35 | 65 | 108 | 91 | 39 | 31 | 33 | |
| Feb-14 | 9 | 8 | 13 | 36 | 18 | 47 | 85 | 108 | 95 | 37 | 43 | 2 | |
| Jan-14 | 12 | 13 | 25 | 22 | 12 | 133 | 88 | 169 | 50 | 44 | 8 | 9 | |
| Dec-13 | 17 | 19 | 24 | 35 | 45 | 103 | 168 | 164 | 66 | 27 | 10 | 14 | |
| Nov-13 | 16 | 26 | 26 | 56 | 71 | 153 | 151 | 70 | 81 | 26 | 29 | | |
| Oct-13 | 13 | 22 | 73 | 132 | 194 | 211 | 121 | 39 | 52 | 23 | | | |
| Sep-13 | 27 | 29 | 138 | 225 | 284 | 120 | 39 | 17 | 37 | | | | |
| Aug-13 | 23 | 35 | 128 | 272 | 151 | 41 | 31 | 19 | | | | | |
| Jul-13 | 55 | 91 | 200 | 150 | 40 | 26 | 19 | | | | | | |
| Jun-13 | 76 | 151 | 136 | 38 | 20 | 20 | | | | | | | |
| May-13 | 82 | 94 | 35 | 19 | 18 | | | | | | | | |
| Apr-13 | 55 | 22 | 9 | 20 | | | | | | | | | |
| Mar-13 | 35 | 10 | 12 | | | | | | | | | | |
| Feb-13 | 26 | 11 | | | | | | | | | | | |
| Jan-13 | 15 | | | | | | | | | | | | |
| Qty add | 29951 | 42299 | 36446 | 27660 | 27922 | 18777 | 15720 | 16688 | 11790 | 10894 | 7767 | 5670 | |
| Added | Jan-13 | Feb-13 | Mar-13 | Apr-13 | May-13 | Jun-13 | Jul-13 | Aug-13 | Sep-13 | Oct-13 | Nov-13 | Dec-13 | |

FIG. 5A

| Returns | Jan-13 | Feb-13 | Mar-13 | Apr-13 | May-13 | Jun-13 | Jul-13 | Aug-13 | Sep-13 | Oct-13 | Nov-13 | Dec-13 |
|---|---|---|---|---|---|---|---|---|---|---|---|---|
|  | 469 | 539 | 837 | 1019 | 864 | 889 | 767 | 694 | 472 | 196 | 121 | 58 |
| Apr-14 | 8 | 8 | 18 | 14 | 11 | 35 | 65 | 108 | 91 | 39 | 31 | 33 |
| Mar-14 | 9 | 8 | 13 | 36 | 18 | 47 | 85 | 108 | 95 | 37 | 43 | 2 |
| Feb-14 | 12 | 13 | 25 | 22 | 12 | 133 | 88 | 169 | 50 | 44 | 8 | 9 |
| Jan-14 | 17 | 19 | 24 | 35 | 45 | 103 | 168 | 164 | 66 | 27 | 10 | 14 |
| Dec-13 | 16 | 26 | 26 | 56 | 71 | 153 | 151 | 70 | 81 | 26 | 29 |  |
| Nov-13 | 13 | 22 | 73 | 132 | 194 | 211 | 121 | 39 | 52 | 23 |  |  |
| Oct-13 | 27 | 29 | 138 | 225 | 284 | 120 | 39 | 17 | 37 |  |  |  |
| Sep-13 | 23 | 35 | 128 | 272 | 151 | 41 | 31 | 19 |  |  |  |  |
| Aug-13 | 55 | 91 | 200 | 150 | 40 | 26 | 19 |  |  |  |  |  |
| Jul-13 | 76 | 151 | 136 | 38 | 20 | 20 |  |  |  |  |  |  |
| Jun-13 | 82 | 94 | 35 | 19 | 18 |  |  |  |  |  |  |  |
| May-13 | 55 | 22 | 9 | 20 |  |  |  |  |  |  |  |  |
| Apr-13 | 35 | 10 | 12 |  |  |  |  |  |  |  |  |  |
| Mar-13 | 26 | 11 |  |  |  |  |  |  |  |  |  |  |
| Feb-13 | 15 |  |  |  |  |  |  |  |  |  |  |  |
| Jan-13 |  |  |  |  |  |  |  |  |  |  |  |  |
| Qty add Added | 29951 | 42299 | 36446 | 27660 | 27922 | 18777 | 15720 | 16688 | 11790 | 10894 | 7767 | 5670 |

CONDITIONAL FORMATING FOR DISPLAY LARGE SCALE INFORMATION ANALYTICS OF RELIABILITY DATA

BACKGROUND OF THE INVENTION

Information analytics techniques have been used to capture and display information, for example about an installed base of equipment, components, software, or other items. Typical approaches include monthly field performance dashboards and/or other displays of summary information for a specified period. For example, a monthly or other field performance dashboard or other summary may compare predicted failure rates (e.g., mean time before failure or "MTBF") to failure rates that actually have occurred in the field during the relevant period.

In other approaches, statistical and/or graphing techniques, such as cumulative fraction removal (CFR) may be used to display a statistical summary of failure or other analytics information and/or to discern trends, make predictions, etc.

When the population is relatively small the above methods may be useful in identifying trends developing in the field that may require corrective action, but as the population gets much larger in some cases emerging trends affecting a significant portion but still minority of the population may be obscured by the overwhelming positive trend of the population as a whole.

BRIEF DESCRIPTION OF THE DRAWINGS

Various embodiments of the invention are disclosed in the following detailed description and the accompanying drawings.

FIG. 5A is a block diagram illustrating an embodiment of a technique to present reliability data.

FIG. 5B is a block diagram illustrating an embodiment of a technique to present reliability data.

DETAILED DESCRIPTION

Figure 1:
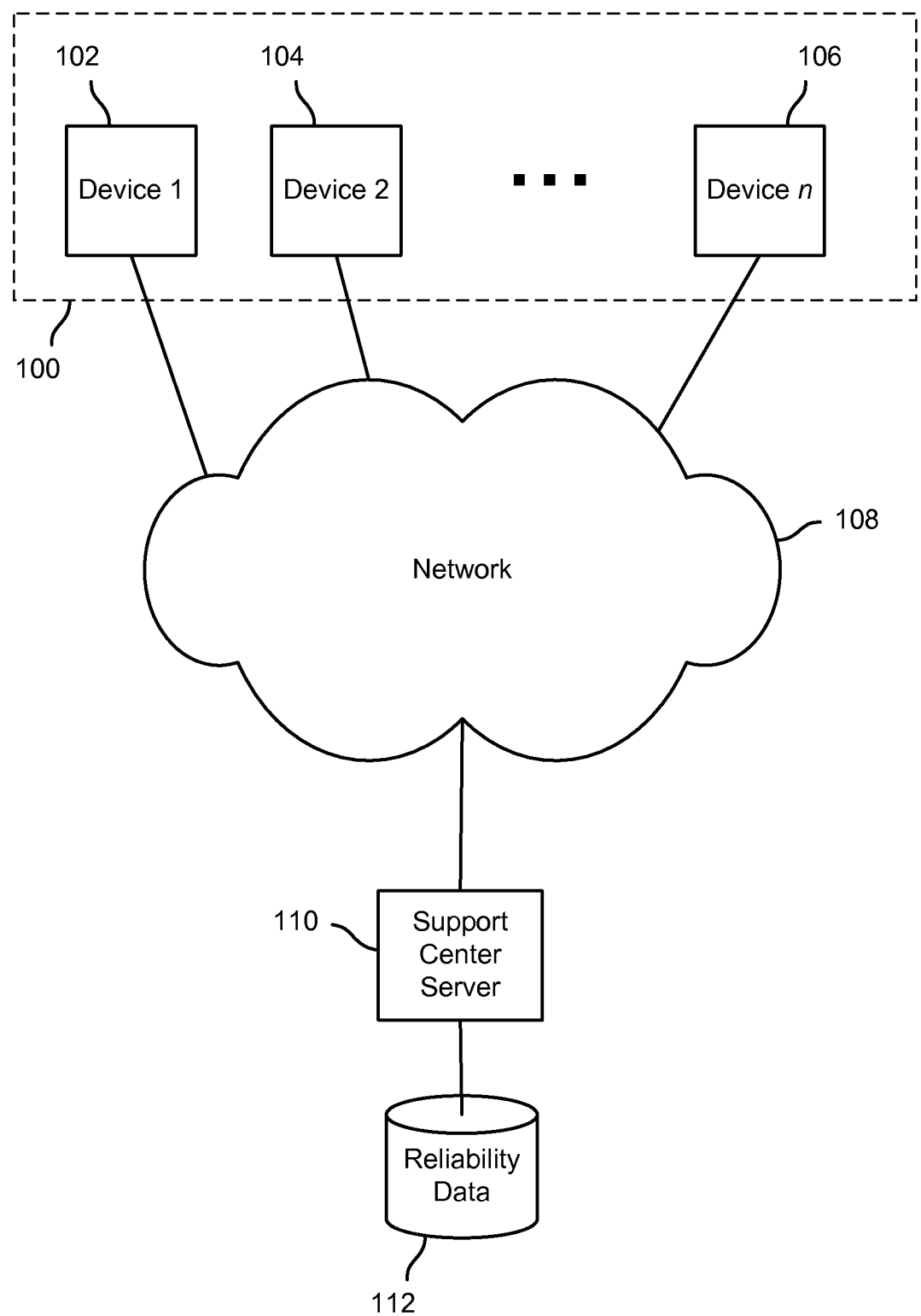
FIG. 1 is a block diagram illustrating an embodiment of a system to receive and analyze reliability.

The invention can be implemented in numerous ways, including as a process; a system; a computer program product embodied on a computer readable storage medium; and/or a processor, such as a processor configured to execute instructions stored on and/or provided by a memory coupled to the processor. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details.

Large scale information analytics techniques are disclosed. In various embodiments, data associated with a large population of objects, such as an installed base of a device, component, etc., may be tracked and displayed in a single, large array, such as a spreadsheet. In some embodiments, monthly shipments of products and associated failures are tracked and used to predict failures into the future. In various embodiments, the population of objects may be tracked in one or more of three ways: by raw quantities (e.g., number shipped each month, and for each such population the number of failures in each succeeding month); by Annualized Failure Rates (AFR); and/or by Mean Time Between Failures (MTBF). In various embodiments, one or more other metrics may be tracked.

In various embodiments, visual displays of information are provided in which colors or other conditional formatting is used, based on statistics, to provide a visual indication of events, trends, etc. affecting a population or portion thereof, e.g., reliability data for all units sold into the field of one type (Field Replacement Unit). As used herein, the term "statistics-based conditional formatting" means formatting determined by performing a statistical analysis on a range of cells and using the analysis to apply to each cell a color, symbol, or other formatting, depending that cell's value relative to other cells in the range. Examples of statistical analysis include, without limitation, determining an even, normal, or other distribution based on values in the range of cells; determining a mean value for the range of cells; and determining a highest and lowest value for the range of cells.

FIG. 1 is a block diagram illustrating an embodiment of a system to receive and analyze reliability. In the example shown, an installed base of devices, components, or other objects 100 comprises a plurality of devices 1 to n, represented in FIG. 1 by devices 102, 104, and 106. Periodically, e.g., monthly, or in some embodiments as failures or other events occur, reliability data and/or reports are sent via network 108, from and/or with respect to devices such as 102, 104, and 106 to a support center or other server 110, which stores the reliability data in a reliability database 112. Example of reliability data include, without limitation, automatically generated and/or sent log data; other automatically generated usage statistics, configuration, and/or other data; and reports entered and transmitted by maintenance personnel, e.g., in connection with repair or replacement of a device (or other object) included in the population 100. In various embodiments, the population 100 may be dynamic in membership, for example as additional devices are shipped, installed, and/or deployed.

In various embodiments, techniques disclosed herein are used to track and analyze the reliability of devices included in a device population such as device population 100 of FIG. 1. For example, in some embodiments, devices are tracked by month shipped, and in each ensuing month the failures that month of devices shipped in the same previous month are tracked and/or analyzed. In some embodiments, reliability data may be used to predict failure rates in the future, as discussed more fully below.

Figure 2:
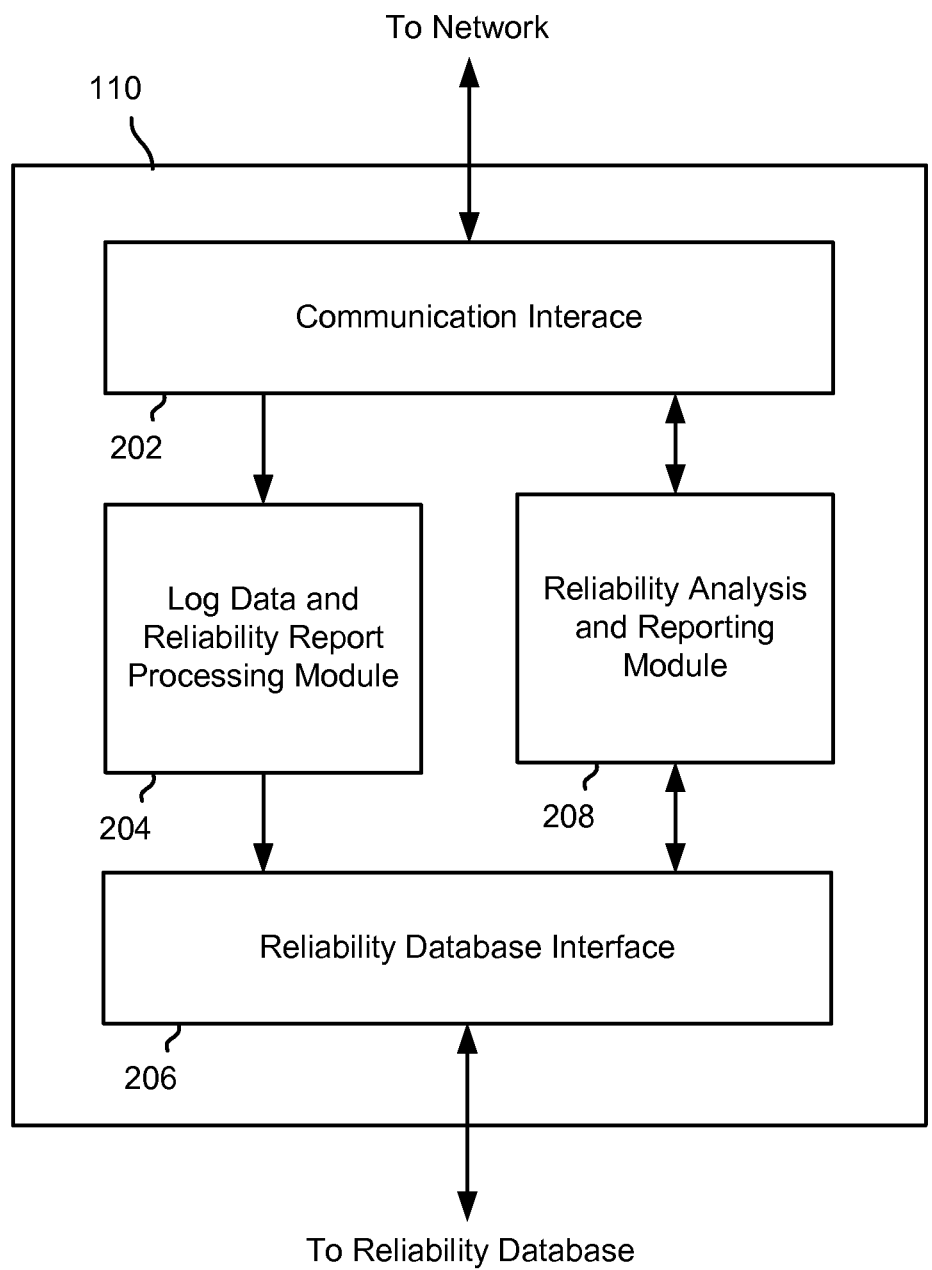
FIG. 2 is a block diagram illustrating an embodiment of a system to analyze reliability.

FIG. 2 is a block diagram illustrating an embodiment of a system to analyze reliability. In some embodiments, the support center server 110 of FIG. 1 comprises the system shown in FIG. 2. In the example shown, the server 110 includes a communication interface 202, e.g., a network interface card (NIC) or other interface, which provides connectivity to a network, such as network 108 of FIG. 1. Log data, failure reports, and/or other reliability data received via communication interface 202 are provided to a log data and reliability report processing module 204, which parses the data and formats at least a subset of data to be stored in an associated reliability database. The log data and reliability report processing module 204 invokes a backend reliability database interface 206 to update a reliability database, such as reliability database 112 of FIG. 1, based on newly-received reliability data. A reliability analysis and reporting module 208 accesses reliability data as stored in the reliability database, and uses the reliability data to generate and present, as disclosed herein, a report and analysis of the reliability data.

Figure 3:
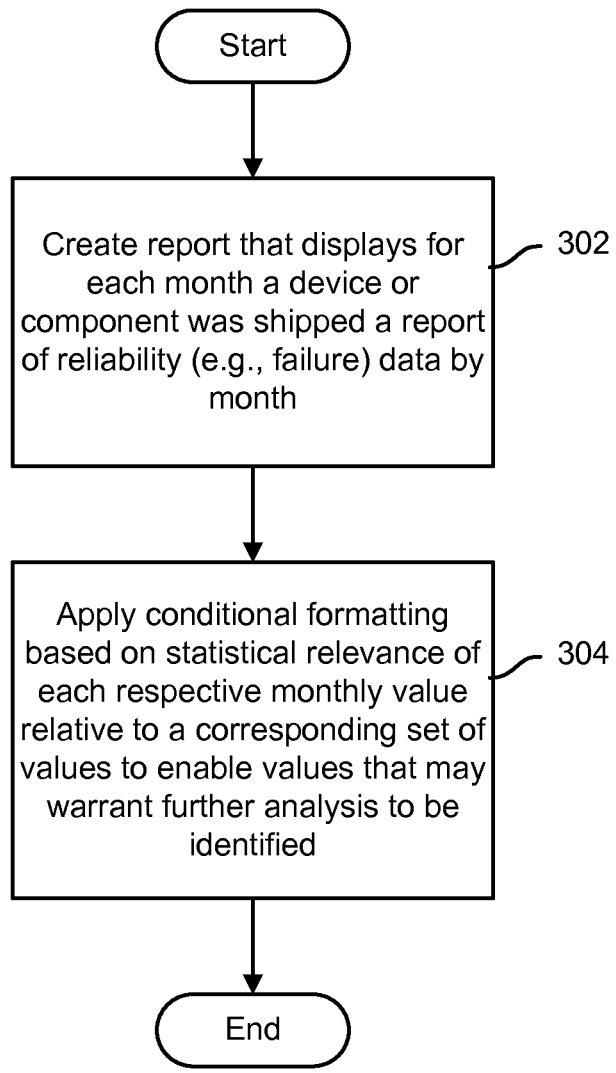
FIG. 3 is a flow chart illustrating an embodiment of a process to analyze and present reliability data.

FIG. 3 is a flow chart illustrating an embodiment of a process to analyze and present reliability data. In various embodiments, the process of FIG. 3 may be implemented by a reliability analysis and reporting module, such as reliability analysis and reporting module 208 of FIG. 2. In the example shown, a report that displays for each month one or more devices or other components were shipped a report of reliability (e.g., number of returns/repairs, annualized failure rate, mean time between failure, etc.) by month in service is created (302). In various embodiments, a spreadsheet or other array is created, which includes for each month for which reliability (e.g., failure) data is available a reliability metric value by shipment month, i.e., the month in which the unit(s) represented by the metric (if any) failed. For example, if shipments began in January of the current year, in some embodiments for April the row would include values (i.e., columns) for the shipping months of January, February, March, and April, indicating for each, for example, one or more of the number of units shipped that month that failed in April, an annualized failure rate (AFR) based on failures in April of units shipped in that shipping month, and/or a mean time between failure (MBTF) based on failures in April of units shipped in that shipping month.

Referring further to FIG. 3, in the example shown conditional formatting is applied, based on the statistical relevance of each respective monthly value, relative to a corresponding set of values, to enable values that may warrant further consideration to be identified at least in part based on a visual scan of the information as presented (304). For example, in some embodiments, a green-yellow-red or other scheme may be used to highlight outlier values. For example, values indicative of low reliability, such as a relatively very high number of failed units and/or a relatively very low MTBF, may be highlighted in red or using another color, formatting, or other visual indication.

Figure 4:
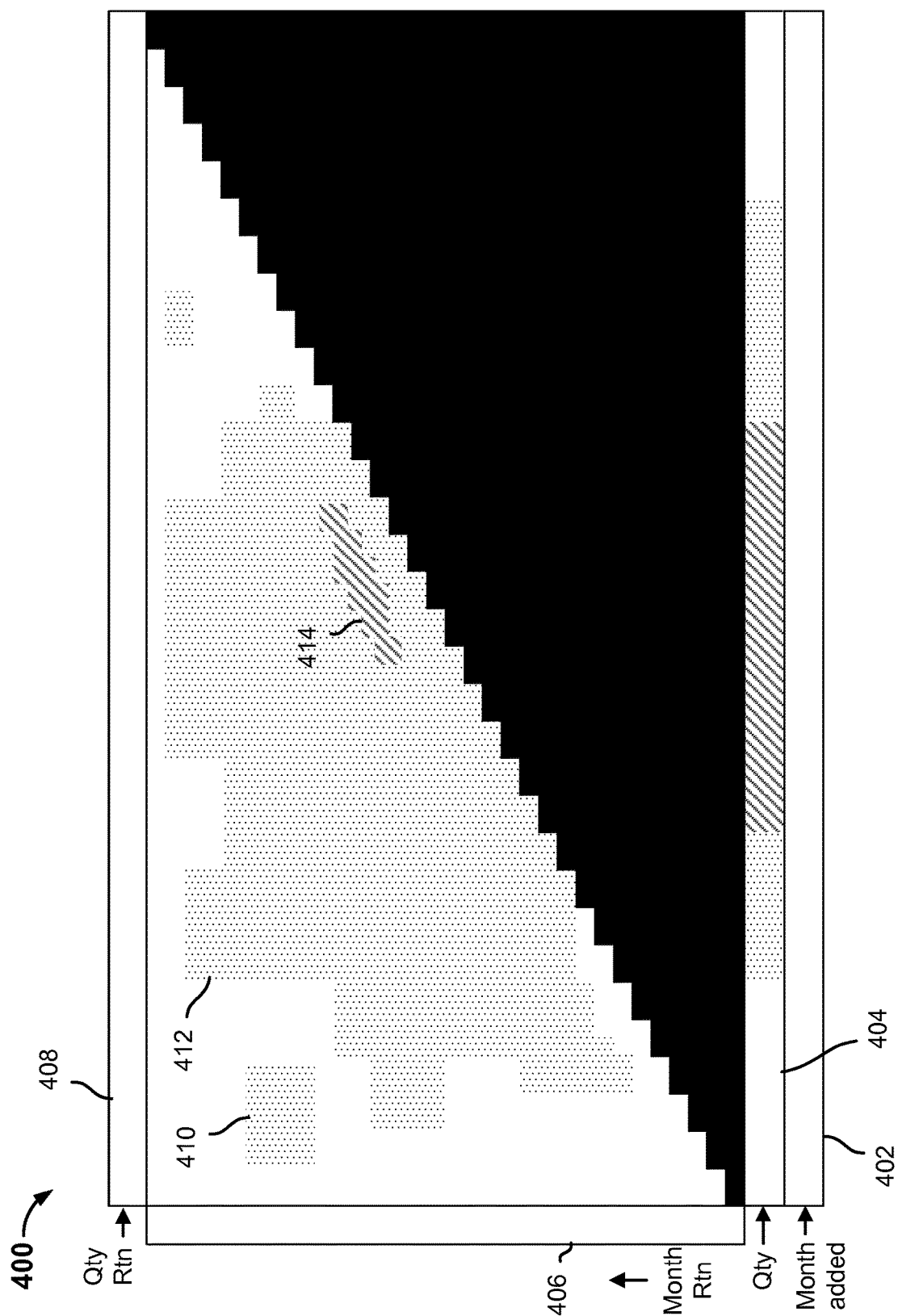
FIG. 4 is a block diagram illustrating an embodiment of a technique to present reliability data.

FIG. 4 is a block diagram illustrating an embodiment of a technique to present reliability data. In various embodiments, the process of FIG. 3 may be used to generate a reliability data analysis tool display 400 as shown in FIG. 4. In the example shown, the display 400 includes for each month in which units have been shipped (or installed, activated, deployed operationally, etc.) an indication of the month in which the shipment was made, e.g., in a corresponding column/cell in a shipping month display row 402, and the corresponding quantity shipped, e.g., in a cell above the month (or other period covered) in the same column, in a "quantity shipped" (or otherwise added) row 404. In FIG. 4, for clarity and to illustrate a low resolution (i.e., highly "zoomed out") view of the display 400, the individual column dividers that would be seen at a higher resolution or "zoomed in" view are not shown. In an analysis month row display area (in this case a column) 406, for each month analyzed, an indication of the month with which the following row of reliability data is associated is displayed.

In various embodiments, and in the example shown in FIG. 4, the shipping months as stored and shown in cells of row 402 and the reliability data reporting months as listed in cells of column 406 both begin with the first month shipped and/or for which reliability data is available (which in many cases may be the same month) being entered at the bottom/leftmost position, with subsequent months (or other periods) being entered and/or displayed in increasing order, e.g., from left to right in the month shipped row 402 or bottom to top in the reliability data reporting month column 406.

In the example shown, the reliability data displayed comprise a quantity of units returned or repaired, by month in which the return/repair occurred (rows) broken out by the number of returns/repairs that month for each monthly population of units shipped. As shown in FIG. 4, the blacked out roughly triangular area in the lower right occurs and is present because it is not possible for units to be returned in a month earlier to the month in which they were shipped. For example, for units shipped in June 2014, there could not have been any returns/repairs in January-May 2014. Instead, the earliest row that could have reliability data for the month of June 2014 would be the row of reliability data corresponding to that reporting month. (As used herein, the "reporting month" is the month in which the failure occurred, regardless of when the information is received and/or processed.)

In the example shown, in a total quantity returned/repaired row 408, the total reliability data for units shipped that month, as reported/experienced across all months (i.e., across all rows having data within that column), is listed. For example, for a shipping month listed in row 402, the monthly reliability data (e.g., repaired/replaced units, AFR, MTBF) in that column is summed to determine a total reliability data value across reporting months for units shipped that month. In some embodiments, not shown in FIG. 4, a column at the far right end of the display 400 would be included to show total reliability data for each respective reporting month, each corresponding to an array row.

In the example shown, colored-coding, represented in FIG. 4 by unfilled (plain white) areas indicating a first color, dotted pattern areas such as 410 and 412, indicating a second color, and cross-hatched area 414 indicating a third color, is used to highlight information in display 400. For example, in some embodiments, a green-yellow-red color scheme may be used to distinguish between areas with relatively low (or high) values for a reliability metric (green or other first color), those with values in a moderate range (yellow or other second color), and those with relatively high (or low)

values (red or other third color). In some embodiments, statistical computations are performed and used to determine conditional formatting for each cell or range of cells relative to a population of cells to which the cell or range of cells are compared. For example, in the example shown in FIG. 4, a range of cells 414 slightly to the right and slightly above center has been color coded "red", indicating for example a relatively high number of returns (compared to other reporting and/or shipping months, for example), a relatively high AFR, a relatively low (short) MBTF, etc.

In some embodiments, an instance of an array such as display 400 may include reliability data for many months, e.g., 120 months. By zooming out to view all 120 columns at a distance, the color-coding as shown in FIG. 4 may enable a viewer to discern patterns and/or identify potential trouble spots in the history and lifecycle of a population of devices, components, etc. For example, in the example shown in FIG. 4, at a glance one can see that for a period of months a relatively high number of units failed within a relatively few months after being shipped, and that after a time failures returned to a more moderate level, corresponding in this example to the area color-coded with the second color, specifically in this example region 412. Note that while in the example shown in FIG. 4 the "hot spot" region 414 is shown as a continuous range of cells in adjacent columns and rows, in other examples the data may be such that one or more hot spots would appear in less continuous fashion, e.g., distributed in various cells throughout display 400. In the example shown, however, the color-coding has highlighted visually a region of interest, which may have taken some considerable time to become aware of and/or localize using other approaches.

In the example shown in FIG. 4, conditional formatting also has been applied to the quantity shipped by month row 404. As shown, in an initial period (far left) the first color is applied, reflecting a relatively low volume of units shipped, which could occur, for example, while a new device, model, etc., is rolled out and manufacturing and sales ramp up. In a next region, color coded with the second color, monthly shipments have increased, followed by a period in which shipments peaked (color coded with the third color, shown as cross-hatching in FIG. 4), after which shipments returned to moderate levels (second color, region second from right) prior to falling off (first color, far right of row 404), e.g., as the device became obsolete, superseded by a later model, etc. In various embodiments, applying color coding to the quantities shipped by month enables the relationship of an area interest as displayed, such as hot spot region 414, to the product life cycle to be understood at a glance. In this example, the hot spot 414 occurred some months after monthly shipments reached peak levels, for example.

In some embodiments, a display such as display 400 may be generated and provided for each of a plurality of reliability metrics and/or values derived from reported values. For examples, in some embodiments, the number of units repaired/replaced is tracked in a first display such as display 400, and one or more other arrays such as the one shown in FIG. 4 may be created and displayed based on the reported data, such as annualized failure rate (AFR) projected based on the number of returns compared to the relevant part of the installed population, a mean time between failures (MTBF), etc.

In some embodiments, a commercially-available spreadsheet application, such as Microsoft® Excel® may be used to create and provide a display of an information analytics array such as display 400 of FIG. 4. In some embodiments, the display 400 is provided by entering and/or importing into cells of a spreadsheet the respective reliability metric data by shipping month-reporting month pair, and using features of the spreadsheet application to apply statistically-determined conditionally formatting to applicable ranges of spreadsheet cells.

In various embodiments, a color-coded spreadsheet or other array, as shown in FIG. 4, may be used in a zoomed-out view, e.g., as shown in FIG. 4, to identify areas of interest (e.g., region 414 of FIG. 4), which can then be zoomed down on to view and perform analysis with respect to the underlying reliability metric values that caused the region of interest to be highlighted via the color-coding.

FIG. 5A is a block diagram illustrating an embodiment of a technique to present reliability data. In some embodiments, a display or display region such as the one shown in FIG. 5A may be accessed by a user of a high level (zoomed out, lower resolution, etc.) view, such as display 400 of FIG. 4, by selecting and zooming in on a region of interest, such as region 414 of FIG. 4. In the example shown, the viewed region 500A shows a portion of display 400 of FIG. 4, such as region 414, at a resolution that enables individual reliability data in the respective displayed cells to be read. In the bottom row, corresponding to row 402 of FIG. 4, shipping months from January 2013 through April 2014 are shown, and for each a number of units shipped in that month is displayed in the cell immediately above the month, i.e., in the second row from the bottom, corresponding to row 404 in the example shown in FIG. 4. In the leftmost column, corresponding to column 406 of FIG. 4, the reporting months from January 2013 through December 2013 are listed. In the topmost row, corresponding to row 408 of FIG. 4, for each shipping month (column) the total number of units returned across all reporting months is displayed. For example, in the top cell of the column second from the left, in this example the value "469" indicates that from February 2013 through April 2014 at total of 469 of the 29,951 units shipped in January 2013 were returned.

In the example shown in FIG. 5A, color-coding as shown in and described above in connection with FIG. 4 has not been shown, to enable the data values and labels to be displayed and explained more clearly. However, in various embodiments, color-coding is maintained when a user zooms in to cause a view such as the one shown in FIG. 5A to be displayed.

FIG. 5B is a block diagram illustrating an embodiment of a technique to present reliability data. In the example shown in FIG. 5B, the data values and labels are the same as those shown in FIG. 5A, except that in the view 500B shown in FIG. 5B, color-coding in the manner illustrated in FIG. 4 is illustrated. In particular, reliability data values in a first, relatively low range (in this example 20 units or less in a given month) are coded with a first color (e.g., green) corresponding to no fill or other visible formatting; reliability data in a moderate range of values (in this example, more than 20 but less than 100 units in a month) are coded with a second color (e.g., yellow) indicated by a dotted fill pattern in FIG. 5B; and reliability data in a relatively high range (in this example 100 units or more in a given month) are highlighted in a third color (e.g., red) indicated in FIG. 5B by cross-hatching.

The color-coded zoomed in view 500B illustrates how readily data of interest can be identified and analyzed visually, in various embodiments, through use of color-coding and/or other conditional formatting as disclosed herein. In the example shown, one can determine through visual inspection that a spike in failures began to occur in July 2013 with respect to units shipped in March 2013, and continued through a number of months with respect to units shipped between March and August 2013, inclusive. For each shipping month in the range, a relatively large number of returns were seen beginning about four months after shipment. In each shipping month, relatively high returns continued for a four month period (give or take a month) and then leveled off back to more moderate levels typical of other shipping month-reporting month pairs. For each shipping month in the affected range of shipping months, the total return value at the top can be compared to the number of units shipped that month to determine and realize that about 5 to 7% of units were affected.

While other techniques could have been used to realize that an increased failure rate had been experienced, in some cases the nature, scope, and extent of the problem would not be revealed. For example, some techniques may have resulted in the higher failure rates experience in the "red" zone as shown in FIGS. 4 and 5B (i.e., region 414 of FIG. 4 and the cross-hatched region of FIG. 5B) being extrapolated out to predict very high future failure rates, whereas one can see from FIG. 5B that in fact for each shipping month the high failure rate receded after about four months of high failure rates, and that for each shipping month only about 5 to 7% of units were returned across all reporting months. In addition, for a very large population of units shipped over a large number of months, other techniques or even a display such as the one shown in FIG. 4 but without color-coding or other statistics based conditional formatting as described herein may have resulted in the significance of the returns experienced in periods corresponding to the "red" zones as shown in FIGS. 4 and 5B being missed, since in the end only a relatively small part of a very large population was affected.

In various embodiments, techniques as disclosed herein may be applied to reliability data that has been weighted, normalized, and/or been computed in a manner so as to attribute a proper relative degree of significance to failures or other reliability data across shipping and/or reporting months, even in cases where the number of units shipped per month varies considerably, as can occur in particular during periods in which a new product is being introduced, eventually ramps up to a stead state and/or peak, and eventual recedes to lower levels toward the end of the product lifecycle.

In some embodiments, repair/return numbers reported by month are used to compute annualized failure rates (AFR). However, in this approach, the same weight is given to each monthly group of units installed when the install quantities are not the same. This may present a statistic accuracy problem when one averages across all months to compute a monthly AFR.

In some embodiments, to avoid the above potential shortcoming, a MTBF (Mean Time Between Failures) analysis array is created based on actual hours in service and failure data. In some embodiments, both an "instantaneous" and a "cumulative" MTBF value may be computed for each reporting month and/or the entire population. In some embodiments, each cell represents one month of time which equates to 720 hours (assuming 30 days per month, for simplicity, in this example). The quantity of units in the field (i.e., quantity shipped that month) is multiplied by 720 hours to know how many total running hours there were for that month. For example if 109 units were shipped, the unit-hours for a given reporting month would be 720 hours/month×109 units for a total of 78400 unit-hours. The result is divided by the number of failures (i.e., failures that reporting month of units shipped in the shipping month of interest), in some embodiments, to compute an "instantaneous" MTBF for the reporting months of units shipped in that shipping month. If there were no failures, in some embodiments a single failure (quantity=1) is assumed, to avoid computing an instantaneous MTBF that is infinite (as a result of dividing by zero).

In some embodiments, the respective instantaneous MTBF values computed for a given reporting month with respect to units shipped in respective shipping months are summed across shipping months to determine an instantaneous MTBF for the reporting month. This tells us the MTBF for the whole field population for any given reporting month by itself.

In some embodiments, a cumulative MTBF is computed by accumulating all time for the installed base, as that population grows over time. By comparing total hours in service as of a given reporting month to total failures up to the time of that reporting month, a cumulative MTBF can be computed. This approach in various embodiments enables the true MTBF of all units for all time, including all failures, and represents the whole population at any given point in time.

In various embodiments, an array comprising computed annualized failure rates (AFR) is created by using the MTBF values computed as described above. In some embodiments, the corresponding AFR for each cell in the array is calculated by dividing the hours in a year by the MTBF computed for the corresponding reporting month-shipping month pair, and then multiplying by 100 to get an AFR expressed as a percentage.

In some cases an array comprising MTBF and/or AFR values computed as described above may have a statistical problem because there may simply not be enough hours in the cell of any given month. In some embodiments, a rule of thumb that at least two times the predicted MTBF of run hours must be available for the reliability data to be statistically significant is used. As an example if the predicted MTBF of a particular unit being tracked has a predicted MTBF on the order of 500,000 hours and reliability data based on only 78,400 hours of run time (as in the 109 unit example above) is available, one may not be able to conclude that the unit has not met its predicted MTBF, because in this example one would not have enough run hours (i.e., 500,000×2=1,000,000 hours) needed under the above-mentioned rule of thumb to be considered significant. However, in various embodiments, applying techniques disclosed herein across a plurality of reporting months may enable a statistically significant MTBF determination to be made for the whole population, e.g., using a cumulative MTBF computed as described above.

Figure 6:
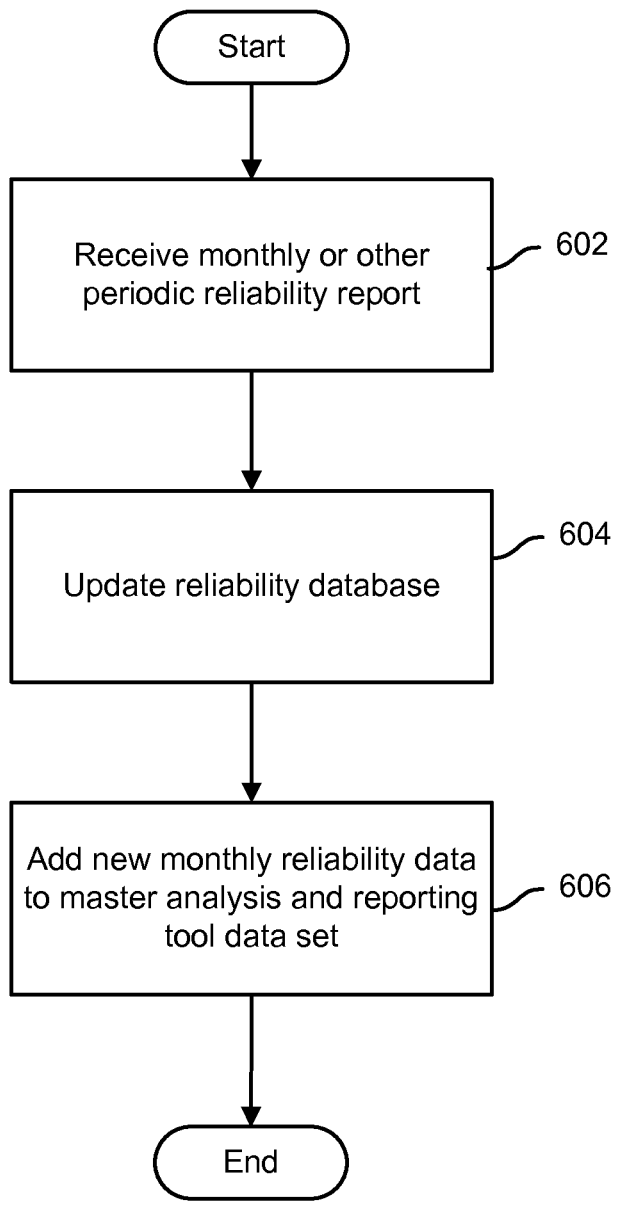
FIG. 6 is a flow chart illustrating an embodiment of a process to analyze and present reliability data.

FIG. 6 is a flow chart illustrating an embodiment of a process to analyze and present reliability data. In various embodiments, the process of FIG. 6 may be implemented by a reliability analysis processing system, such as support center server 110 of FIG. 1. In the example shown, monthly and/or other periodic reliability data is received (602). The received data is used to update a reliability database (604), such as reliability database 112 of FIG. 1. The newly-received reliability data is added to a master analysis and reporting tool data set, such as a data set used to provide an array or other visual representation of reliability data over time, such as display 400 of FIG. 4.

Figure 7:
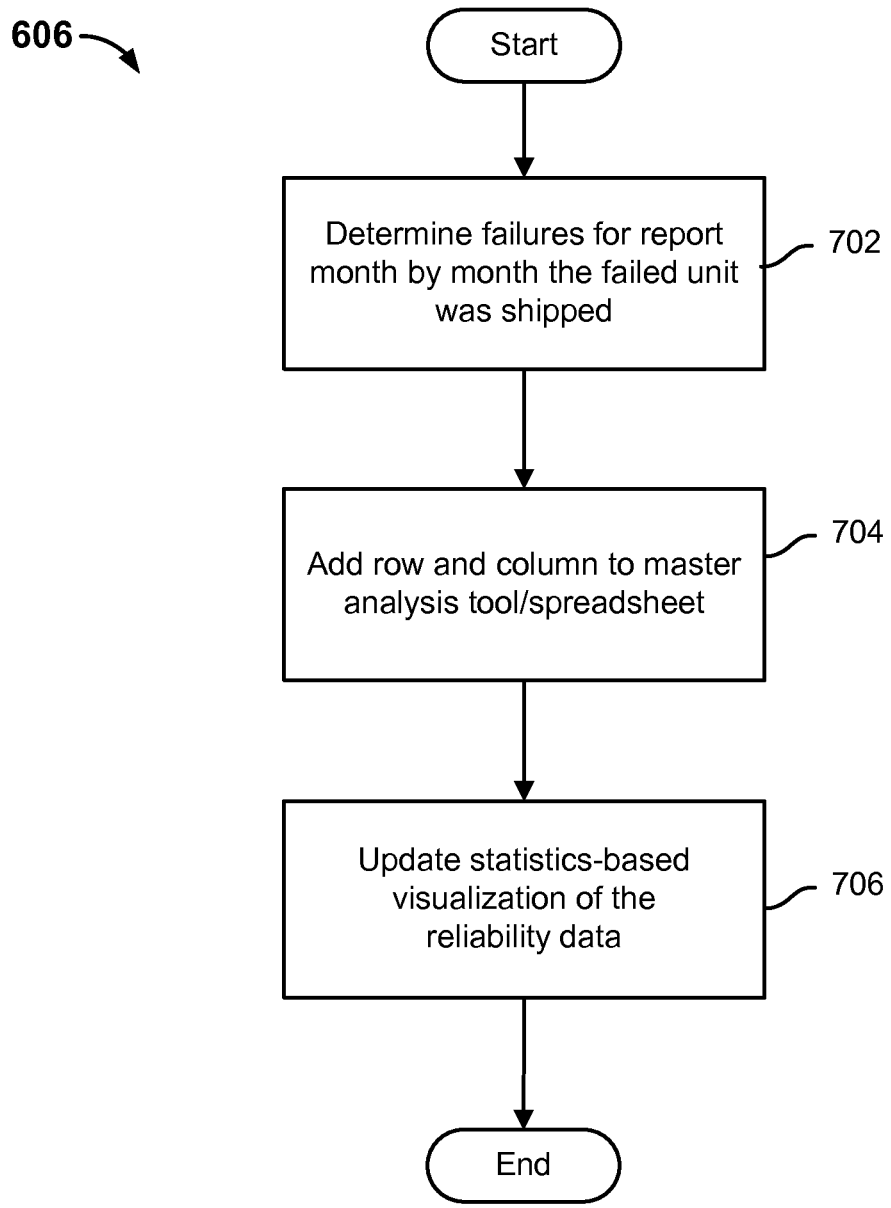
FIG. 7 is a flow chart illustrating an embodiment of a process to update a tool to analyze and present reliability data.

FIG. 7 is a flow chart illustrating an embodiment of a process to update a tool to analyze and present reliability data. In some embodiments, the process of FIG. 7 is used to implement step 606 of the process of FIG. 6. In the example shown, received reliability data is used to determine for a reporting month, broken out by shipping month, the failures during that reporting month (702). For example, unit serial number and/or other unique identifying unit may be used to determine for each unit repaired/replaced that month the shipping month in which that unit was shipped. A row for the current reporting month (and in some embodiments a column for the current or most recent month as a shipping month) is added to the master analysis tool, e.g., a spreadsheet or other array, such as display 400 of FIG. 4 (704). A statistics-based visualization of reliability data as shown in the array or other display is updated to include the added row and/or column (706).

In some embodiments, access to underlying reliability data, for example, failures reported with respect to specific units, detailed operational information and/or statistics about such units and/or where they were installed, etc., may be made accessible. In some embodiments, for example, a link to such underlying data may be provided, such as by embedding such a link in an array cell in which summary reliability data is displayed.

In various embodiments, techniques disclosed herein may be used to identify groups of units in the field with unusually high failure rates. For example, knowing the serial number of the high failing units in the field may enable a manufacturer or other support organization to examine the failure analysis done on those specific returned units. This may allow the cause of the high failure rates (e.g., 414 of FIG. 4) to be determined and timely corrective action to be taken to prevent future units from being shipped with the same defect. In some embodiments, units may be purged out of the field based on, for example, knowledge that the high failure rate was due to an electrical component with a specific date code. Units in the field with this same date code component can be purged and replaced with good units without that problematic date code component to prevent future failures from occurring in the field.

Figure 8:
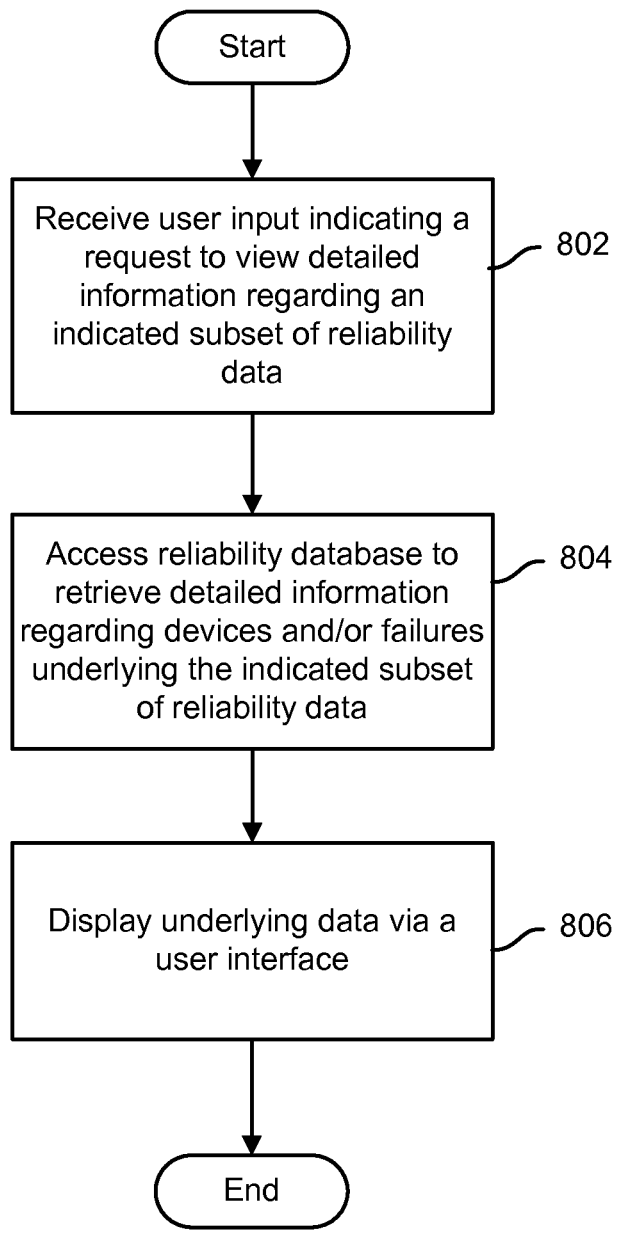
FIG. 8 is a flow chart illustrating an embodiment of a process to provide access to detailed reliability data.

FIG. 8 is a flow chart illustrating an embodiment of a process to provide access to detailed reliability data. In various embodiments, the process of FIG. 8 may be implemented at least in part by a reliability analysis processing system, such as support center server 110 of FIG. 1. In the example shown, a user input indicating a request to view detailed reliability data associated with a user-indicated subset of displayed reliability data is received (802). For example, in some embodiments a link or other control may be embedded in and/or otherwise associated with displayed reliability data, and the indication of interest may comprise in indication that the user has double-clicked or otherwise activated the link. In response, a reliability database is accessed to obtain detailed information regarding devices and/or failures underlying the displayed reliability data with respect to which the indication of interest has been received (804). For example, in some embodiments, double clicking on a cell in a displayed array such as display 400 of FIG. 4 or display portion 500B of FIG. 5B may result in a query being generated and used to obtain detailed information about failures reported in a reporting month with which the cell is associated (i.e., the array row) with respect to units that were shipped in a shipping month with which the cell is associated (i.e., the column). Retrieved detailed data is then formatted and displayed, e.g., in a pop-up window or frame added to and/or overlaid on top of the displayed array (806).

In various embodiments, reliability as tracked, analyzed, and displayed herein may be used to predict failure rates for future periods.

Figure 9:
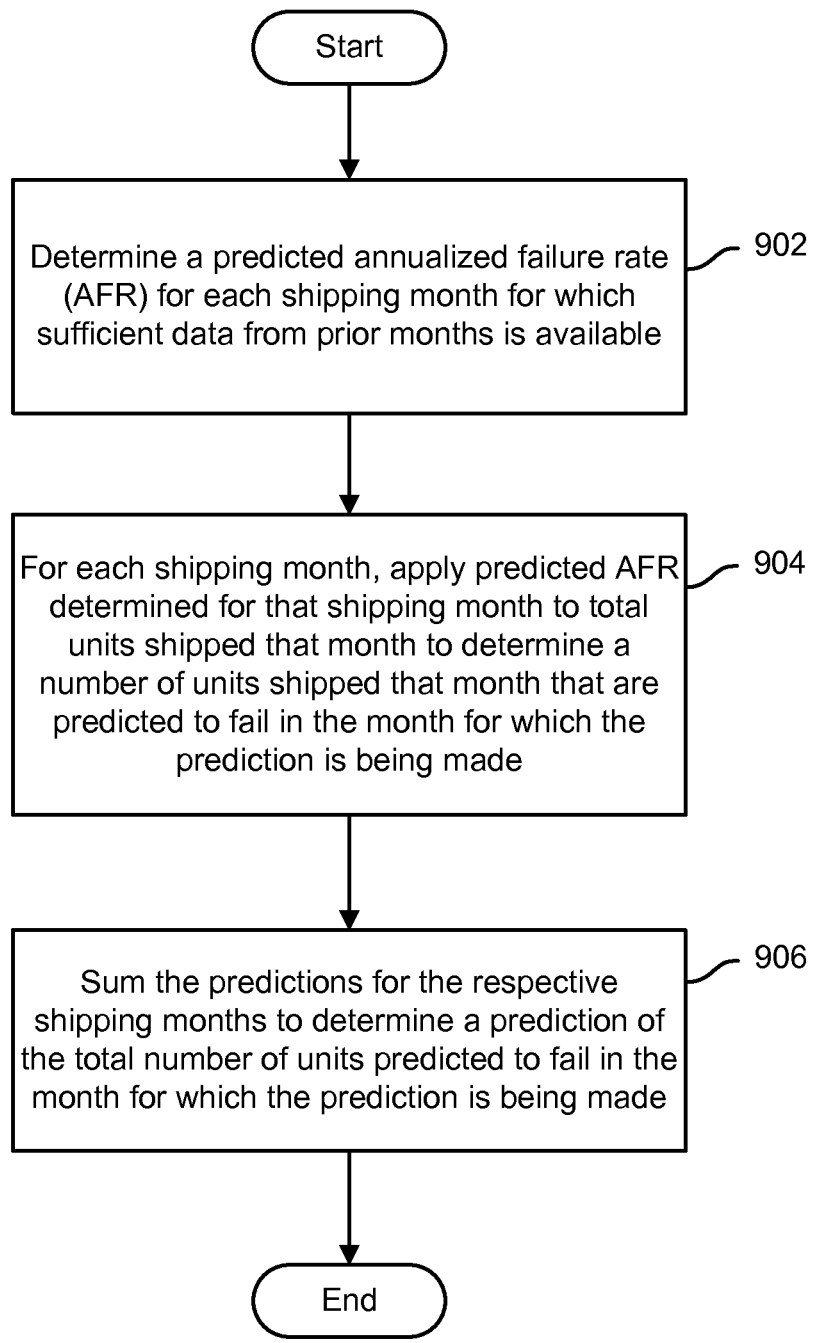
FIG. 9 is a flow chart illustrating an embodiment of a process to use reliability data to predict failures.

FIG. 9 is a flow chart illustrating an embodiment of a process to use reliability data to predict failures. In various embodiments, the process of FIG. 9 may be implemented by a prediction module included in a reliability analysis processing system, such as support center server 110 of FIG. 1, and/or integrated into a reliability data analysis and reporting tool, such as a spreadsheet or other implementation of a tool such as display 400 of FIG. 4. In the example shown, reported reliability data, specifically computed annualized failure rates calculated based on reported reliability data, are used to determine for each shipment month for which (sufficient) data from prior months is available a predicted monthly AFR reflecting a number of units from the population shipped in that shipping month that are predicted to fail in the month for which a prediction is being computed (902). For example, if a prediction is being made for the month of February 2011 (the "prediction month") with respect to units shipped in December 2010, the actual AFR computed for January 2011 with respect to units shipped two months previously (i.e., in November 2010), the actual AFR computed for December 2010 with respect to units shipped two months previously (i.e., in October 2010), etc., would be averaged in various embodiments to determine a predicted AFR for the shipping month-prediction month pair. In some embodiments, to arrive at a more accurate predicted AFR a weighted average of corresponding prior months' respective AFR's may be used. For example, AFR's calculated for prior months may be weighted based at least in part on the relative number of units shipped in the shipping month with which the calculated AFR value is associated.

For each shipping month, the predicted AFR computed for that month (with respect to the prediction month) is applied to the total number of units shipped in that shipping month to determine a number of units shipped that month that are predicted to fail in the prediction month (904). The respective numbers of units predicted to fail in the prediction month are summed, across all shipping months for which a prediction was made, to determine a total number of units predicted to fail in the prediction month (906). In some embodiments, APR and/or MTBF values implied by the number of units predicted to fail may be computed.

Figure 10:
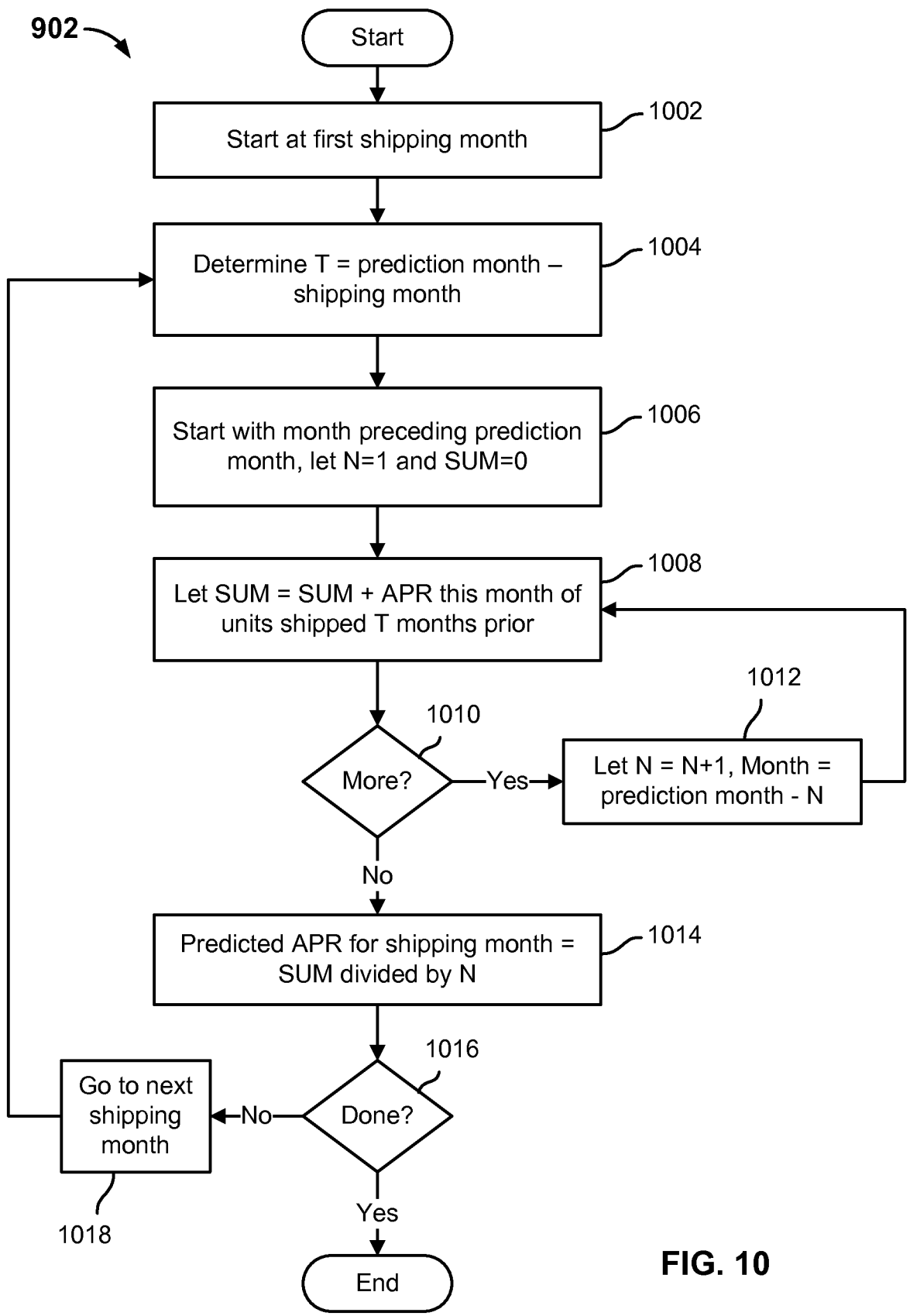
FIG. 10 is a flow chart illustrating an embodiment of a process to use reliability data to predict failures.

FIG. 10 is a flow chart illustrating an embodiment of a process to use reliability data to predict failures. In some embodiments, the process of FIG. 10 may be used to implement step 902 of the process of FIG. 9. In the example shown, starting with a first shipping month (1002), a period of time T representing the difference (e.g., number of months) between the month for which a prediction is being made (i.e., the "prediction" month) and the shipping month is determined (1004). Starting with the month preceding the prediction month, and initially setting a counter N=1 and a temporary sum (of APR values to be averaged) SUM=0 (1006), an APR value computed previously and stored for the month currently being considered with respect to a shipping month T months prior to the month currently being considered is added to the temporary sum (1008). In the example above, for example, the actual AFR computed for January 2011 with respect to units shipped two months previously (i.e., in November 2010) may be added to the temporary sum. If computed APR values are available for more prior months (1010), the counter N is incremented by 1 and the month being considered is set to the prediction month-N months (1012), resulting in the next previous month being considered. The APR computed for the month now being considered with respect to the shipping month T months prior is added to the temporary sum (1008). Successive iterations of steps 1012 and 1008 are performed until no further reliability data from prior months is available (1010), at which point a predicted APR for the shipping month currently being considered is determined by diving the temporary sum SUM by the final value of the counter N (1014), representing the number of months for which data was available (i.e., the number of APR values included in the temporary sum). If predictions are to be made for further shipping months (1016), processing advances to a next shipping month and a further iteration of steps 1004, 1006, 1008, 1010, 1012, and 1014 is performed. Once predicted APR values have been computed for all applicable shipping months (1016), the process of FIG. 10 ends.

In various embodiments, techniques disclosed herein may enable reliability data that warrants further investigation to be identified through visual inspection. Further investigation of reliability data of interest may be facilitated. In some embodiments, reliability data analyzed as disclosed herein may be used, applying techniques disclosed herein, to make accurate predictions about reliability in future periods.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   arranging, by one or more processors, reliability data in an array, comprising a plurality of linear arrays each of which includes reliability data for a corresponding reporting period, the reliability data including for each of a plurality subpopulations of items a corresponding reliability metric for that subpopulation with respect to the reporting period, wherein the reliability data comprises an annualized failure rate of an installed base that is computed based on a number of repair or returns over a predefined period and a mean time between failures;
   receiving, by one or more processors, an input from a user, wherein the input is associated with a level of detail with respect to the reliability data which the user wishes to view;
   applying, by one or more processors, a statistics-based conditional formatting to a range of cells comprising the array, including by using a processor to perform a statistical analysis on the range of cells and using the analysis to determine for and apply to each cell a color, symbol, or other formatting determined at least in part by that cell's value relative to other cells in the range of cells, wherein the conditional formatting and the range of the cells is determined based at least in part on the input received from the user;
   providing, by one or more processors, the reliability data on a user interface based at least in part on the statistics-based conditional formatting to the user, and providing a predicted annualized failure rate indicating a number of units of an installed base that are expected to fail during the reporting period, wherein one or more of the reliability data and the predicted annualized failure rate is based at least in part on data that is updated in response to receiving updated reliability data, and the predicted annualized failure rate indicates the number of units of the installed base that are expected to fail during the reporting period comprise a current value based at least in part on characteristics of the installed base; and
   determining, by one or more processors, at least part of the installed based that is to be subject to a corrective action, the at least the part of the installed base that is to be subject to the corrective action being determined based at least in part on the reliability data, the predicted annualized failure rate, one or more identifiers corresponding to units comprised in the installed base, and the type of failure for units that have failed, and the reliability data comprising information pertaining to a type of failure for units that have failed.

2. The method of claim 1, wherein the statistics-based conditional formatting is applied at least in part by invoking a function or other automated method to apply a first cell formatting to a first set of cells having a first degree of statistical significance relative to a reference population of cells and a second cell formatting to a second set of cells having a second degree of statistical significance relative to the reference population.

3. The method of claim 1, wherein the array comprises a two-dimensional array and each of the linear arrays comprises a row of the array.

4. The method of claim 1, wherein the array comprises a spreadsheet.

5. The method of claim 1, wherein the reliability data further comprises one or more of the following: a number of units that failed; a number of units that were repaired; a number of units that were replaced; and a mean time between failures.

6. The method of claim 1, wherein each reporting period comprises a reporting month.

7. The method of claim 1, wherein each of the plurality of subpopulations comprises a set of items shipped during a corresponding shipping period.

8. The method of claim 7, wherein each corresponding shipping period comprises a shipping month.

9. The method of claim 1, wherein the reliability data for a given reporting period includes for each of a plurality of shipping periods a corresponding reliability date for that reporting month with respect to items shipped during that shipping period.

10. The method of claim 1, wherein the array includes for each of a plurality of reporting periods a corresponding row and for each of a plurality of shipping periods a corresponding column, the reporting periods and shipping periods being arranged in an increasing order by date with both the earliest reporting period and the earliest shipping period starting at or near a common origin at a corner of the array.

11. The method of claim 1, further comprising receiving the reliability data and using the reliability data to populate the array.

12. The method of claim 1, further comprising displaying the array, with the conditional formatting applied.

13. The method of claim 12, further comprising receiving a user input associated with an indication of interest in a subset of the reliability data as arranged in the array.

14. The method of claim 13, further comprising retrieving and displaying detailed information associated with the subset of the reliability data with respect to which the indication of interest was received.

15. The method of claim 1, wherein the reliability data further comprises numbers of units repaired or replaced during the reporting period and the method further comprising using the numbers of units repaired or replaced to compute a mean time between failures for the reporting period.

16. The method of claim 15, wherein the mean time between failures computed for the reporting period comprises an instantaneous mean time between failures, and further comprising comparing cumulative hours of service from a starting time prior to the reporting period up to and including the reporting period to a cumulative number of failures up until that same time to determine a cumulative mean time between failures for the entire population of items that exist as of that time.

17. The method of claim 1, further comprising using the reliability data for a plurality of prior reporting periods to compute a predicted reliability data for a future period.

18. The method of claim 17, wherein the reliability data includes annualized failure rate data and computing the predicted reliability data for the future period includes determining an average of the respective annualized failure rates for each of a plurality of prior reporting periods.

19. The method of claim 18, wherein the average comprises a weighted average.

20. The method of claim 19, wherein the respective weights are determined based at least in part on the respective quantities of items with respect to which the respective annualized failure rates for said prior reporting periods were determined.

21. The method of claim 1, wherein a first cell formatting comprises a first color; a first set of cells having a first degree of statistical significance comprise cells having reliability data values on a relatively higher end of a range of values in the array; a second cell formatting comprises a second color; and a second set of cells having a second degree of statistical significance comprise cells having reliability data values on a relatively lower end of a range of values in the array.

22. The method of claim 1, wherein the reliability data is obtained from log data that is automatically generated.

23. The method of claim 22, further comprising:
receiving the log data; and
in response to receiving the log data, invoking an update to a reliability database storing the reliability data.

24. The method of claim 1, wherein the providing the reliability data on the user interface comprises:
receiving an input to a selected cell of the array;
in response to receiving the input to the selected cell, querying reliability data for reliability data corresponding to a reporting month with which the selected cell is associated; and
providing the reliability data corresponding to the reporting month with which the selected cell is associated.

25. The method of claim 1, wherein the current value is based at least in part on an instantaneous reliability data of the installed base.

26. The method of claim 1, wherein the installed base for which the reliability data and the predicted annualized failure rate is provided is dynamic based at least in part on one or more of device failures or additional devices being installed or deployed.

27. The method of claim 1, wherein the one or more identifiers corresponding to units comprised in the installed base comprise serial numbers corresponding to the units comprised in the installed base.

28. The method of claim 1, wherein the characteristics of the installed base comprises the number of units of the installed base.

29. A computer system, comprising:
a display device; and
a processor coupled to the display device and configured to:
arrange reliability data in an array displayed via the display device, the array comprising a plurality of linear arrays each of which includes reliability data for a corresponding reporting period, the reliability data including for each of a plurality of subpopulations of items a corresponding reliability metric for that subpopulation with respect to the reporting period, wherein the reliability data comprises an annualized failure rate of an installed base that is computed based on a number of repair or returns over a predefined period and a mean time between failures;
receiving an input from a user, wherein the input is associated with a level of detail with respect to the reliability data which the user wishes to view; and
apply a statistics-based conditional formatting to at least a subset of cells comprising the array, including by performing a statistical analysis on the range of cells and using the analysis to determine for and apply to each cell a color, symbol, or other formatting determined at least in part by that cell's value relative to other cells in the range of cells;
provide the reliability data on a user interface based at least in part on the statistics-based conditional formatting to the user, and provide a predicted annualized failure rate indicating a number of units of an installed base that are expected to fail during the reporting period, wherein one or more of the reliability data and the predicted annualized failure rate is based at least in part on data that is updated in response to receiving updated reliability data, and the predicted annualized failure rate indicates the number of units of the installed base that are expected to fail during the reporting period comprise a current value based at least in part on characteristics of the installed base; and
determine at least part of the installed based that is to be subject to a corrective action, the at least the part of the installed base that is to be subject to the corrective action being determined based at least in part on the reliability data, the predicted annualized failure rate, one or more identifiers corresponding to units comprised in the installed base, and the type of failure for units that have failed, and the reliability data comprising information pertaining to a type of failure for units that have failed.

30. The computer system of claim 29, wherein the statistics-based conditional formatting is applied at least in part by invoking a function or other automated method to apply a first cell formatting to a first set of cells having a first degree of statistical significance relative to a reference population of cells and a second cell formatting to a second set of cells having a second degree of statistical significance relative to the reference population.

31. The computer system of claim 29, wherein the reliability data for a given reporting period includes for each of a plurality of shipping periods a corresponding reliability date for that reporting month with respect to items shipped during that shipping period.

32. The computer system of claim 29, wherein the array includes for each of a plurality of reporting periods a corresponding row and for each of a plurality of shipping periods a corresponding column, the reporting periods and shipping periods being arranged in an increasing order by date with both the earliest reporting period and the earliest shipping period starting at or near a common origin at a corner of the array.

33. The computer system of claim 29, wherein the processor is further configured to display the array via the display device, with the conditional formatting applied.

34. The computer system of claim 29, wherein the processor is further configured to use the reliability data for a plurality of prior reporting periods to compute a predicted reliability data for a future period.

35. A computer program product, the computer program product being embodied in a non-transitory computer readable storage medium and comprising computer instructions for:
- arranging, by one or more processors, reliability data in an array, comprising a plurality of linear arrays each of which includes reliability data for a corresponding reporting period, the reliability data including for each of a plurality subpopulations of items a corresponding reliability metric for that subpopulation with respect to the reporting period, wherein the reliability data comprises an annualized failure rate of an installed base that is computed based on a number of repair or returns over a predefined period and a mean time between failures;
- receiving, by one or more processors, an input from a user, wherein the input is associated with a level of detail with respect to the reliability data which the user wishes to view;
- applying, by one or more processors, a statistics-based conditional formatting to a range of cells comprising the array, including by using a processor to perform a statistical analysis on the range of cells and using the analysis to determine for and apply to each cell a color, symbol, or other formatting determined at least in part by that cell's value relative to other cells in the range of cells;
- providing, by one or more processors, the reliability data on a user interface based at least in part on the statistics-based conditional formatting to the user, and providing a predicted annualized failure rate indicating a number of units of an installed base that are expected to fail during the reporting period, wherein one or more of the reliability data and the predicted annualized failure rate is based at least in part on data that is updated in response to receiving updated reliability data, and the predicted annualized failure rate indicates the number of units of the installed base that are expected to fail during the reporting period comprise a current value based at least in part on characteristics of the installed base; and
- determining at least part of the installed based that is to be subject to a corrective action, the at least the part of the installed base that is to be subject to the corrective action being determined based at least in part on the reliability data, the predicted annualized failure rate, one or more identifiers corresponding to units comprised in the installed base, and the type of failure for units that have failed, and the reliability data comprising information pertaining to a type of failure for units that have failed.

* * * * *